United States Patent Office 2,943,923
Patented July 5, 1960

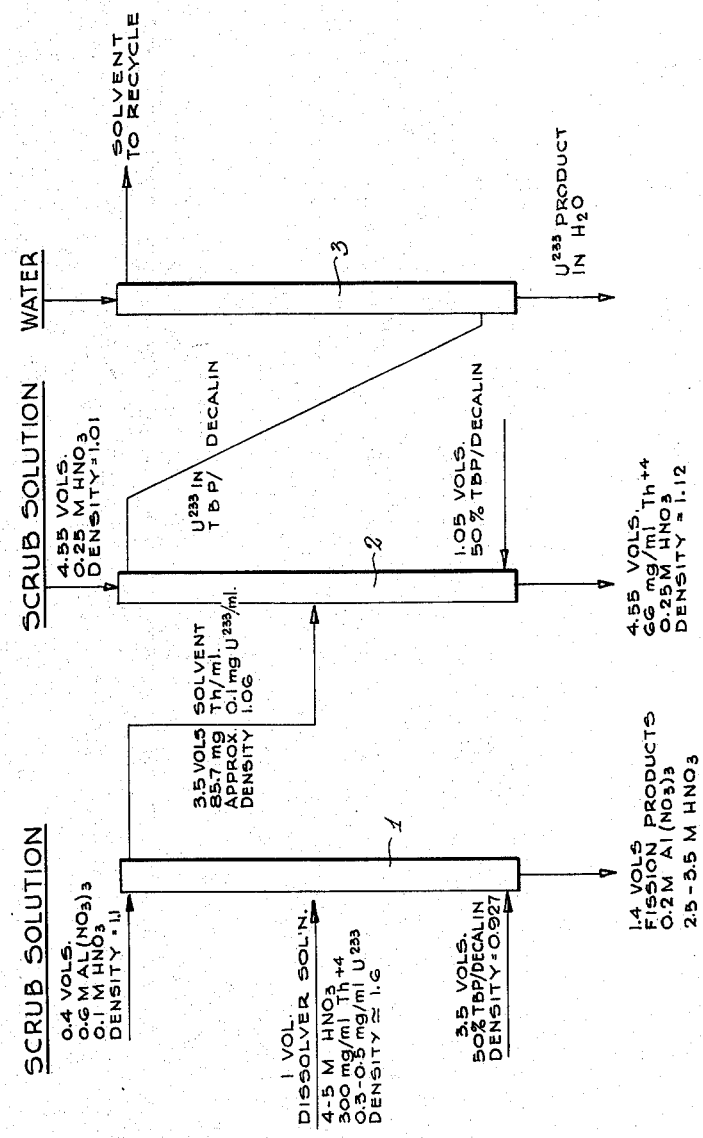

2,943,923

PROCESSING OF NITRATE SOLUTIONS CONTAINING THORIUM AND URANIUM $^{233}$

William W. Morgan, Deep River, Ontario, Canada, assignor to Atomic Energy of Canada Limited, Ottawa, Ontario, Canada, a company of Canada Filed Feb. 10, 1958, Ser. No. 714,134

3 Claims. (Cl. 23—312)

This invention relates to a process for the treatment of nitric acid solutions, derived from the solution of neutron irradiated fuel rods, containing thorium, uranium$^{233}$ and fission products.

The object of the invention is to provide an improved solvent extraction process which will conveniently and efficiently extract the thorium and uranium from the acid solutions and other fission products therein, and which is well adapted for three column treatment of the acid solutions.

In dissolving the fuel rod material in nitric acid it is usual to add a fluoride to catalyze the reaction. The composition of the dissolver solution may be illustrated as follows:

| | |
|---|---|
| Th | 300 mg./ml. |
| HNO$_3$ | 4–5 M. |
| F$^-$ | 0.05 M. |
| U$^{233}$ | ~0.4 mg./ml. |
| F.P. | ~2 curies β/kg. Th. |
| F.P. | ~1 curie γ/kg. Th. |

Other extraction processes involving the use of tributyl phosphate have been proposed for the treatment of irradiated thorium-containing fuels. One such method involves concurrent extraction of U$^{233}$ and Th from an acid deficient solution with tributyl phosphate in a kerosene type diluent. Thorium is preferentially backwashed from the solvent with 0.25 M nitric acid and the U$^{233}$ is recovered with water or with 0.1 M nitric acid. In rendering the solution deficient in acid it is evaporated to molten thorium nitrate to remove nitric acid. Because of the presence of the fluoride ion and the high temperature used a serious corrosion problem is involved.

Another such method involves extraction of U$^{233}$ and Th separately. The former is extracted from the acid solution into 5% tributyl phosphate-kerosene (v./v.) solvent and is then backwashed from the solvent with water or dilute acid. Thorium is extracted from the solution by 100% tributyl phosphate and precipitated from the solvent with oxalic acid. The 5% and 100% tributyl phosphate concentrations in the respective solvents are used to eliminate the possibility of third phase formations which occur at intermediate tributyl phosphate concentrations with kerosene type diluents in the system.

A further object of the present invention is to provide a process whereby U$^{233}$ and Th are co-extracted from the normal acid dissolver solution by direct treatment in a three column system, which may preferably operate in series with the solution of the fuel material.

For this purpose it has been found that tributyl phosphate mixed with deca-hydro-naphthalene "(Decalin)" forms an efficient solvent. The solvent may contain 10 to 60% of tributyl phosphate in the diluent but preferably 30 to 50%. However, it will be recognized that low concentration of the tributyl phosphate in the diluent requires larger solvent volume and more stages of treatment. It is desirable to have a low concentration of the tributyl phosphate to depress the extraction of fission products and the high concentration to extract thorium. It will be observed that the volume ratio of solvent to the solution under treatment will also vary with the concentration of tributyl phosphate in the solvent and the composition of the solution. For example, at 50% tributyl phosphate concentration and 300 mg./ml. thorium in the solution the solvent to solution volume or flow ratio is 3.5 to 1. At 30% tributyl phosphate concentration and 300 mg./ml. thorium the ratio is 7 to 1. The thorium nitrate tributyl phosphate complex formed in acidic solutions is soluble in the presence of the "Decalin" diluent and no third phase component is formed to interfere with direct operation.

Some grades of "Decalin" contain impurities which react with nitric acid, forming reaction products which produce undesirable effects in the extraction. They are purified by treatment with concentrated sulphuric acid at room temperature, followed by two washes with water to remove last traces of sulphate from the "Decalin." The pure "Decalin" has physical properties as defined below, which make it an efficient diluent in the process.

| | |
|---|---|
| Flash point | 135° F. |
| Density at 20° C. | 0.896 gm./ml. |
| Boiling range | 188°–195° C. |
| Stability to HNO$_3$ | Good. |
| Viscosity | 2.41 centipoises at 25° C. |

The process of the invention will now be described with reference to the accompanying drawing which represents a three column flow sheet used in operation. For illustration and ease of understanding, the flow sheet tabulates volume, composition and density of the various solutions fed to and recovered in a particular operation.

The composition of the fuel material or dissolver solution is indicated above. The dissolver solution is continuously fed into column 1 in counter-current flow with the extracting solvent and the scrub solution, in the manner indicated. As the solvent flows in the column it progressively extracts the U$^{233}$ and Th, which are at maximum concentration at the point where the dissolver solution enters the column. Above this point the solvent containing the U$^{233}$, Th and fission products is in continuous contact with the scrub solution which washes out the fission products. The nitrate solution, containing fission products, is continuously discharged at one end of the column and the solvent containing the U$^{233}$ and the Th continuously pass to column 2. It will be recognized that the columns need not be in vertical position shown in the specific illustration.

It will be observed that the volume flow and concentration of the solutions entering the system may vary from those disclosed in the flow sheet and yet directly recover practically all (99.9+% of the U$^{233}$ and Th from the acidic dissolver solution. Nitric acid concentration in the dissolver solution, in the illustrative flow sheet, is 4–5 M and 3 to 4 volumes of the solvent are used for each volume of the dissolver solution.

In column 2 the thorium is removed from the solvent solution from column 1 as shown in the flow sheet and the solvent carrying the U$^{233}$ passes to column 3. As the concentration of tributyl phosphate in the extracting solvent is decreased within the range of 10 to 60% the concentration of nitric acid in the scrub solution may be widely varied. The nitric acid concentration is adjusted to provide efficient separation consistent with convenient flow ratios as previously described, in column 1, lines 65–72; and column 2, lines 1–14.

In column 3 the solvent containing the U$^{233}$ is passed in counter current flow with water or water acidified with nitric acid. The solvent is recovered adjacent the top of the column and the $U^{233}$ in water at the bottom.

This direct treatment of the acid solution of the fuel material with a single solvent insures a recovery and separation of practically all of the $U^{233}$ and Th in the dissolver solution in its passage through the three column system and without pretreatment of the dissolver solution. Thus the process operates conveniently in series with the solution treatment of the fuel material.

I claim:

1. A process for the treatment of nitric acid solutions of neutron irradiated thorium-containing material which comprises treating the solution with an extracting solvent consisting of tributyl phosphate in decahydronaphthalene.

2. The process defined in claim 1 wherein fission products are removed in one column extraction, thorium in a second column extraction and uranium in a third column extraction.

3. A process for the direct and separate extraction of $U^{233}$ and Th from nitrate solutions of neutron irradiated fuel material which comprises contacting the solution in a column with a counter current flow of a solvent consisting of substantially 10–60% of tributyl phosphate in decahydronaphthalene to remove fission products, treating the solvent extract containing the $U^{233}$ and Th in a second column with aqueous nitric acid to separate the Th and with the solvent to retain the $U^{233}$ in the solvent, and washing the second extract with water to remove $U^{233}$ from the solvent.

References Cited in the file of this patent

Bartlett: AEC publication K–706, Feb. 27, 1951, pp. 6, 7.

Gercke: AEC publication UCRL–1493, Oct. 9, 1951, page 4.

Gresky: "Solvent Extraction Separation of $U^{233}$ and Thorium From Fission Product by Means of Tributyl Phosphate," United Nations publication, 1955, vol. 9, pages 505–510.